United States Patent
Suzuki et al.

(10) Patent No.: US 8,635,919 B2
(45) Date of Patent: Jan. 28, 2014

(54) PRESSURE DETECTION UNIT AND PRESSURE DETECTION DEVICE

(75) Inventors: Takahiro Suzuki, Kyoto (JP); Yoshihiro Kai, Kyoto (JP); Jun Shimizu, Kyoto (JP); Yohko Imai, Kyoto (JP); Seiko Hirai, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 13/392,588

(22) PCT Filed: Aug. 26, 2010

(86) PCT No.: PCT/JP2010/064497
§ 371 (c)(1),
(2), (4) Date: May 11, 2012

(87) PCT Pub. No.: WO2011/024902
PCT Pub. Date: Mar. 3, 2011

(65) Prior Publication Data
US 2012/0222499 A1 Sep. 6, 2012

(30) Foreign Application Priority Data
Aug. 28, 2009 (JP) ................................ 2009-198704

(51) Int. Cl.
*G01L 1/04* (2006.01)
(52) U.S. Cl.
USPC .................................................. 73/862.627
(58) Field of Classification Search
USPC .................................................... 73/862.627
See application file for complete search history.

(56) References Cited

U.S. PATENT DOCUMENTS

| 4,794,366 | A | | 12/1988 | Sakamoto |
| 5,583,303 | A | * | 12/1996 | Franz ........................ 73/862.046 |
| 6,373,373 | B1 | * | 4/2002 | Saito ................................ 338/47 |
| 7,343,807 | B2 | * | 3/2008 | Lorenz ............................. 73/715 |
| 7,920,225 | B2 | * | 4/2011 | Nishikawa et al. ............. 349/60 |
| 8,094,134 | B2 | * | 1/2012 | Suzuki et al. .................. 345/173 |
| 8,294,674 | B2 | * | 10/2012 | Yu ................................... 345/173 |
| 2002/0056918 | A1 | | 5/2002 | Saito |
| 2009/0140996 | A1 | | 6/2009 | Takashima et al. |
| 2011/0115738 | A1 | | 5/2011 | Suzuki et al. |

FOREIGN PATENT DOCUMENTS

| JP | 62116230 A | 5/1987 |
| JP | 2001165788 A | 6/2001 |
| JP | 200248658 A | 2/2002 |
| JP | 2002364251 A | 12/2002 |
| JP | 2006170829 A | 6/2006 |
| JP | 2006266812 A | 10/2006 |
| JP | 200846817 A | 2/2008 |
| JP | 2009134473 A | 6/2009 |
| WO | 2010074116 A1 | 7/2010 |

* cited by examiner

*Primary Examiner* — Lisa Caputo
*Assistant Examiner* — Octavia Davis-Hollington
(74) *Attorney, Agent, or Firm* — The Webb Law Firm (57) ABSTRACT

A pressure detection unit includes a first substrate and a second substrate which are disposed in opposition to each other and subject to load from the outside, a pair of electrodes provided in distribution in the first substrate and the second substrate, the electrodes being disposed linearly in opposition to each other, electrically conductive pressure-sensitive ink disposed between the pair of electrodes to cover at least one of these electrodes and having electrical characteristics which varies according to the load, and an adhesion member for adhering the first substrate and the second substrate to each other with the pair of electrodes and the pressure-sensitive ink being placed in contact with each other.

6 Claims, 6 Drawing Sheets

PRESSURE DETECTION UNIT AND PRESSURE DETECTION DEVICE

BACKGROUND OF THE INVENTION

The present invention relates to a pressure detection unit and a pressure detection device for use in e.g. an information input device that allows information input by a user's pressing on a panel member.

DESCRIPTION OF RELATED ART

Conventionally, a pressure-sensitive sensor is known as a device having a press detection function for detecting a pressing force (see Patent Document 1). The pressure-sensitive sensor disclosed in Patent Document 1 comprises plastic films facing and bonded to each other via an insulating layer having adhesion layers on the front and back faces thereof, each plastic film including an electrode and a pressure-sensitive ink layer laid one on the other.

The present applicant filed a patent application for an arrangement configured for restricting reduction in visibility of a displaying portion when the pressure-sensitive sensor of Patent Document 1 is to be used in a touch panel from which visibility is required (Japanese Patent Application No. 2008-330288, WO 2010/074116). The pressure-sensitive sensor for a touch panel disclosed in Japanese Patent Application No. 2008-330288 (WO 2010/074116) has a same arrangement for its vertically stacked portion as the arrangement disclosed in Patent Document 1. In addition, as shown in FIG. 11, a pair of electrodes 21a, 22a are disposed in the form of frames along edges of plastic films 21A, 22A and two layers of pressure-sensitive ink 23a, 23b are provided in the form of spots distributed along the edge portions of the plastic films 21A, 22A.

Patent Document 1: Japanese Unexamined Patent Application Publication 2002-48658

SUMMARY OF THE INVENTION

Figure 11:
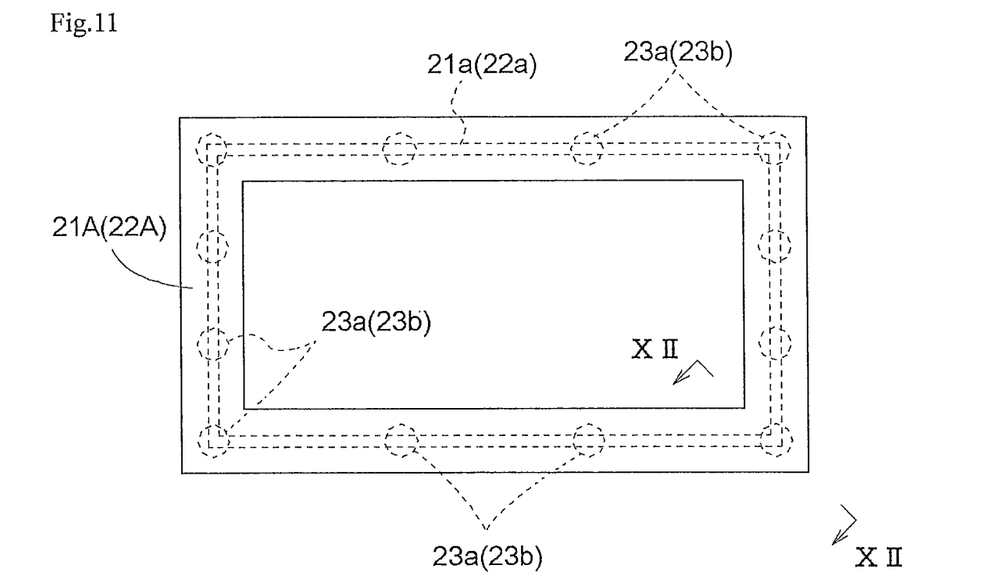
FIG. 11 is a view showing a conventional example of a pressure detection unit.
Figure 12:
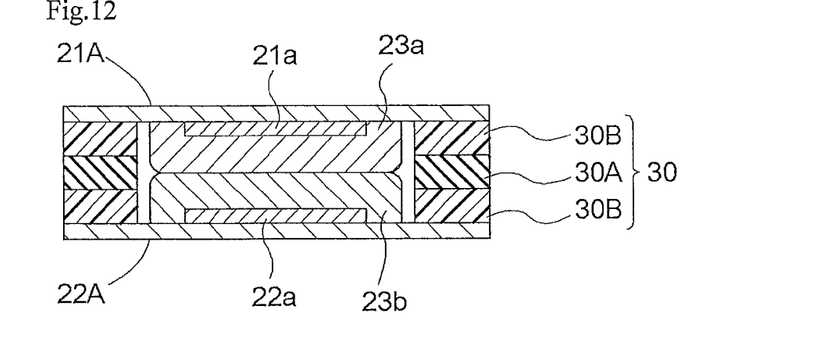
FIG. 12 is a section view taken along XII-XII line in FIG. 11.

In the case of the pressure-sensitive sensor shown in FIG. 11, of the pair of the electrodes 21a, 22a, only their sensor portions which are present in the form of dots are covered with the pressure-sensitive ink 23a, 23b. Therefore, the electrodes 21a, 21b portions other than their sensor portions are not covered with the pressure-sensitive ink 23a, 23b. For this reason, there was a risk that the electrodes 21a, 21b portions other than their sensor portions may directly contact each other or come into contact with each other via adhesion layers 30 disposed between the plastic film 21A and the plastic film 22A, thus establishing inadvertent electric conduction. In view of this, as shown in FIG. 12, for example, an insulation member 30A was provided in the middle of the adhesion layers 30 so as to prevent electric conduction between the electrodes 21a, 21b portions other than their sensor portions.

However, if the insulation member 30A is provided in the middle of the adhesion layers 30, the adhesion layer is formed as a three-layer construction comprising the insulation member 30A bound between the adhesion members 30B, so the pressure-sensitive sensor tends to be formed thick. And, when the adhesion layer 30 is formed thick, a press operation on the sensor portion will be hindered by the adhesion layer 30 per se, whereby the sensitivity of the sensor portion will be reduced.

In view of the above, the object of the present invention is to provide a pressure detection unit and a pressure detection device that have good sensitivity in their sensor portions to a press operation.

According to the first characterizing feature of a pressure detection unit relating to the present invention, the pressure detection unit comprises a first substrate and a second substrate which are disposed in opposition to each other and subject to load from the outside, a pair of electrodes provided in distribution in the first substrate and the second substrate, the electrodes being disposed linearly in opposition to each other, electrically conductive pressure-sensitive ink disposed between the pair of electrodes to cover at least one of these electrodes and having electrical characteristics which varies according to the load, and an adhesion member for adhering the first substrate and the second substrate to each other with the pair of electrodes being placed in contact with the pressure-sensitive ink.

With the above-described construction, between a pair of electrodes provided in distribution in the first substrate and the second substrate and disposed linearly in opposition to each other, there is provided electrically conductive pressure-sensitive ink disposed to cover at least one of these electrodes. As a result, the entire area where the linearly formed electrodes and the pressure-sensitive ink are disposed is formed as a linear-shaped pressure detection portion, so that a large pressure detection area can be secured. Further, due to the provision of an adhesion member that adheres the first substrate and the second substrate to each other with the pair of electrodes and the pressure-sensitive ink being placed in contact with each other, there is formed constant contact between the electrodes and the pressure-sensitive ink, thereby to improve the detection sensitivity of the pressure detection portion to a pressing operation.

Moreover, as the electrically conductive pressure-sensitive ink is disposed to cover at least one of the pair of electrodes, there will occur no inadvertent direct contact or indirect contact via the adhesion member between the pair of electrodes. Therefore, there is no need for providing the adhesion member with any insulation layer and the adhesion member can be formed of an adhesion layer alone. Furthermore, by reducing the thickness of the adhesion member, the thickness of the pressure detection unit per se can be reduced also.

According to the second characterizing feature of the pressure detection unit relating to the present invention, the pair of electrodes are arranged in the form of frames.

With the above-described construction, the pair of electrodes are arranged in the form of frames and the pressure-sensitive ink too is (are) arranged in the form of frame(s). Thus, the position-alignment between the pair of electrodes and the pressure-sensitive ink is facilitated.

According to the third characterizing feature of the pressure detection unit relating to the present invention, the first substrate and the second substrate are provided in the form of frames.

With the above-described construction, the pressure detection unit per se is provided in the form of frames. With this, even when e.g. a display portion is disposed in the inside portion surrounded by the frame-like substrate, the pressure detection unit does not affect the visibility of this display portion at all.

According to the fourth characterizing feature of the pressure detection unit relating to the present invention, the adhesion member draws the first substrate and the second substrate to each other, thereby to apply an initial load to the pressure-sensitive ink.

Since the adhesion member draws the first substrate and the second substrate to each other, thereby to apply an initial load to the pressure-sensitive ink, an unstable detection value obtained at the initial stage can be eliminated automatically. Hence, even when the pressure detection unit is to detect a pressing force of light load, the detection accuracy of the pressing force is improved. Further, this will also serve to minimize the range of error for the detection values (resistance values) for loads. As a result, the pressing force determination accuracy can be improved.

According to the fifth characterizing feature of the pressure detection unit relating to the present invention, the pressure detection unit further comprises a load transmission member provided on at least one of the outer face of the first substrate and the outer face of the second substrate for transmitting the load to the pressure-sensitive ink in concentration.

With the above-described construction, when a load is applied from the outside to the pressure detection unit, the load transmission member supports the pressure detection portion having the electrodes and the pressure-sensitive ink, in concentration without dispersing this load, so that this load is transmitted to the pressure-sensitive ink in a reliable manner. In this way, as the pressure-sensitive ink is pressed in a reliable manner, the pressing force determination accuracy of the pressure detection unit can be enhanced.

According to the sixth characterizing feature of the pressure detection unit relating to the present invention, the load transmission member is formed with its cross sectional area progressively decreased as it extends away from the outer face of the first substrate or the second substrate.

With the above-described construction, even when e.g. the peripheral edge portion of a panel member is warped or flexed upwards during a pressing operation of this panel member, it is possible to restrict change (decrease) of the contact area between the load transmission member and the external member (e.g. the panel member or the like). That is, the load transmission member will allow a certain amount of posture change between the pressure detecting portion having the electrodes and the pressure-sensitive ink and the external member which presses this pressure detection portion. Therefore, when posture change between the pressure detecting portion and the external member is small, the load transmission member restricts dispersion of the load applied from the outside to the other portion than the pressure detecting portion.

According to the characterizing feature of a pressure detection device relating to the present invention, the pressure detection device comprises a panel member having a rectangular outer shape and a pressure detection portion for detecting a pressing force to the panel member; wherein the pressure detection portion includes a pair of electrodes disposed linearly in opposition to each other and electrically conductive pressure-sensitive ink disposed between the pair of electrodes to cover at least one of these electrodes and having electrical characteristics which varies according to the pressing force, the pressure detection portion being disposed in at least a part of the edge portion along the longitudinal direction of the panel member.

With the above-described construction, since the pressure detection portion includes a pair of electrodes disposed linearly in opposition to each other and electrically conductive pressure-sensitive ink disposed between the pair of electrodes to cover at least one of these electrodes and having electrical characteristics which varies according to the pressing force, the entire area where the linearly formed electrodes and the pressure-sensitive ink are disposed is formed as a linear-shaped pressure detection portion, so that a large pressure detection area can be secured. Further, the panel member exposed to a pressing force generally tends to be warped or flexed along the longitudinal direction. So, if the pressure detection portion is disposed in the edge portion along the longitudinal direction of the panel member, displacement between the pair of electrodes can be detected easily, so that the detection sensitivity of the pressure detection portion is enhanced.

DESCRIPTION OF THE PREFERRED EMBODIMENTS

Next, embodiments of a pressure detection unit relating to the present invention will be explained with reference to the accompanying drawings.

Embodiment 1

Figure 1:
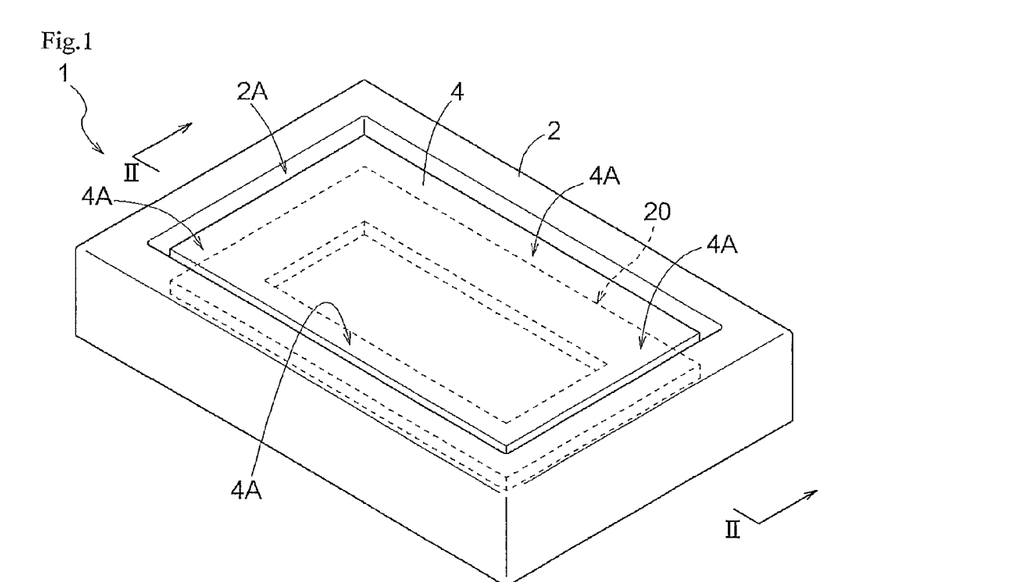
FIG. 1 is a perspective view of an information input device mounting a pressure detection unit relating to the present invention.
Figure 2:
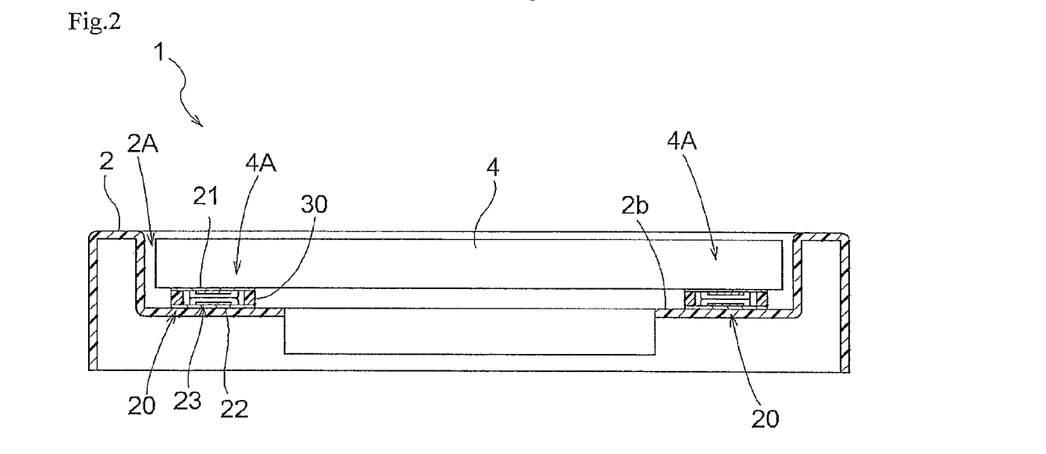
FIG. 2 is a section view taken along II-II line in FIG. 1.

First, the construction of an information input device 1 mounting a pressure detection unit 20 relating to the present invention will be explained with reference to FIGS. 1 through 4. As shown in FIG. 1, the information input device 1 includes a housing body 2 forming an opening portion 2A or the like in its front face, a panel member 4 having a touch-type information input function, and a pressure detecting means including a pressure detection unit 20 for detecting a pressing operational force to the panel member 4.

Figure 4:
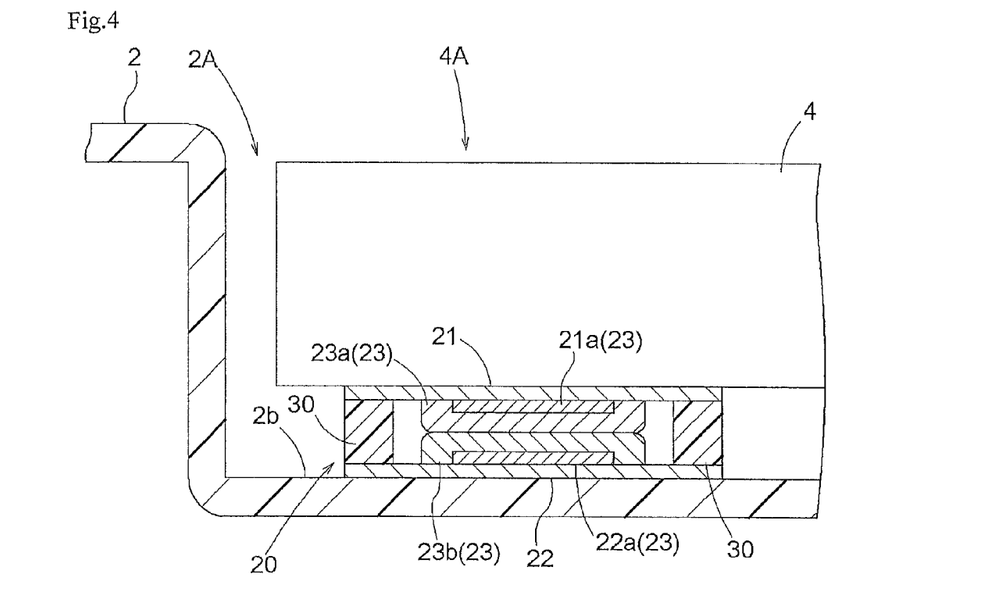
FIG. 4 is an enlarged view of the vicinity of the pressure detection unit of FIG. 2.

The pressure detecting means, as shown in FIG. 4, is comprised of the pressure detection unit 20 provided between and across the panel member 4 and a support portion 2b of the housing body 2, an unillustrated signal processing circuit for processing output signals from the pressure detection unit 20, and so on. As the panel member 4, if such a member having the so-called touch input function for detecting a user's touch operation on the panel member 4 through detection of the X-Y coordinates of this operated position is employed, pressure detection and the X-Y coordinates detection can both be effected by the pressure detection unit alone, so that the convenience of the device will be enhanced. As the device having the touch input function, it can be selected from the resistive film type, the electrostatic capacitance type, and the electromagnetic induction type, etc.

Figure 3:
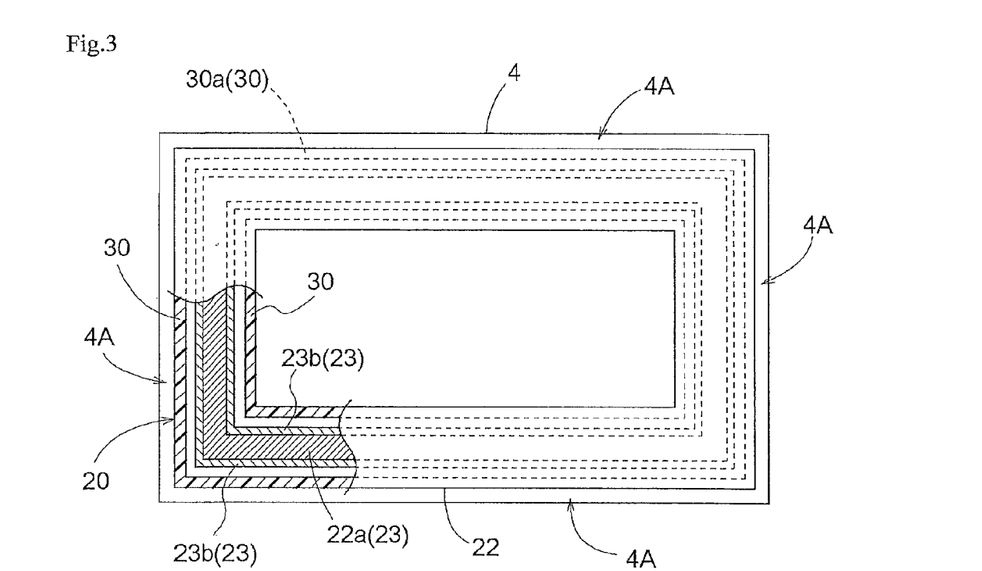
FIG. 3 is a view showing layout of the inventive pressure detection unit in the information input device.
Figure 5:
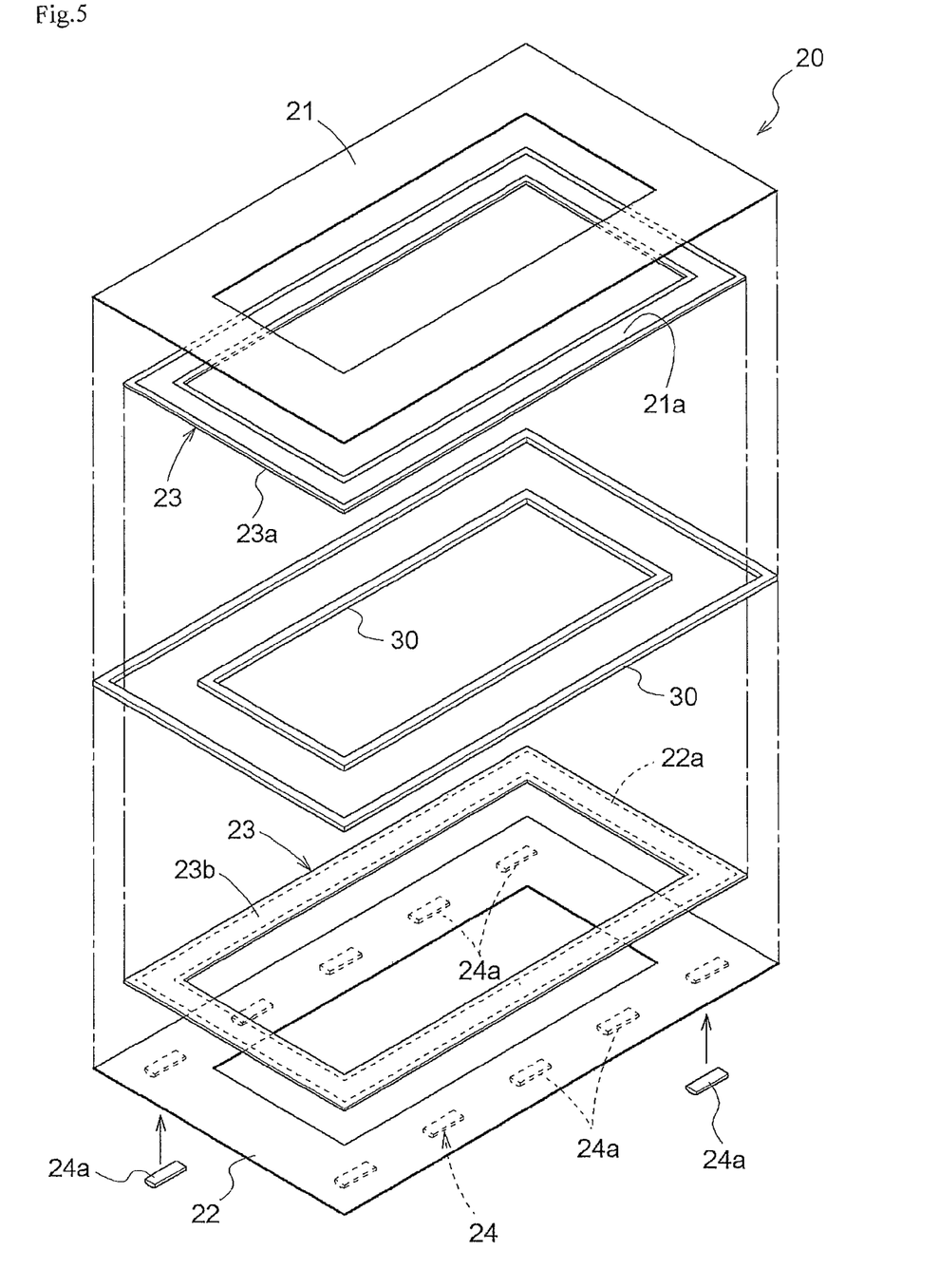
FIG. 5 is an exploded perspective view of the pressure detection unit relating to the present invention.

Next, the construction of the pressure detection unit 20 will be explained. FIG. 3 is a view showing layout of the pressure detection unit in the information input device. FIG. 4 is an enlarged view of the vicinity of the pressure detection unit of FIG. 2. FIG. 5 is an exploded perspective view of the pressure detection unit.

As shown in FIGS. 3 through 5, the pressure detection unit 20 used in the information input device 1 includes frame-like first and second substrates 21, 22 which are disposed in opposition to each other to receive a load from the outside. The inside dimensions of the frame-like first substrate 21 and the frame-like second substrate 22 are set to match the dimensions of the opening portion 2A and the outside dimensions thereof are set to match an X-Y coordinates detection device (not shown) separately provided. On the face of the first substrate 21 in opposition to (i.e. facing) the second substrate 22, there is disposed a linear-shaped upper electrode 21a in the form of frame.

On the face of the second substrate 22 in opposition to (i.e. facing) the first substrate 21, there is disposed a linear-shaped lower electrode 22a in the form of frame in opposition to the upper electrode 21a. Namely, the pair of electrodes 21a, 22a are provided in distribution in the first substrate 21 and the second substrate 22 linearly in opposition to each other.

On the first substrate 21, there is mounted a frame-like upper pressure-sensitive ink 23a so as to cover the upper electrode 21a. Similarly, for the second substrate 22 too, on this second substrate 22, there is mounted a frame-like lower pressure-sensitive ink 23b so as to cover the lower electrode 22a and also in opposition to the upper pressure-sensitive ink 23a. Alternatively, as for these pressure-sensitive ink 23a, 23b, only one of these may be provided. And, it will suffice for the ink to cover at least one of the pair of electrodes 21a, 22a. The mounting (disposing) area of the pressure-sensitive ink 23a, 23b relative to the first substrate 21 or the second substrate 22 will be set greater than the mounting (disposing) area of one of the pair of electrodes 21a, 22a. The electrode portion is designed to be slightly smaller than the printing dimensions of the pressure-sensitive ink. However, the electrode portion and the pressure-sensitive ink may be same in dimensions as long as an arrangement is provided for preventing one electrode from directly contacting the other electrode mounted on the opposed substrate.

That is, a pressed detection portion 23 includes the upper electrode 21a formed on the first substrate 21, the lower electrode 22a formed on the second substrate 22 in opposition to the upper electrode 21a, the upper pressure-sensitive ink 23a covering the upper electrode 21a and the lower pressure-sensitive ink 23b in opposition to the upper pressure-sensitive ink 23a to cover the lower electrode 22a.

In the area where the first substrate 21 and the second substrate 22 oppose to each other and along the peripheral edge of the pressure detection portion 23, an adhesion member 30 is disposed. Preferably, the adhesion member 30 is bound between the first substrate 21 and the second substrate 22 and draws these first and second substrates 21, 22 to each other and urges them toward the pressure-sensitive 23a, 23b thereby to apply an initial load thereto. The adhesion member 30 comprises e.g. a non-elastic spacer (including layers for adhesion to the substrates 21, 22 or can be an amount of adhesive agent alone) whose thickness is rendered smaller than that of the pressure detection portion 23. In case deformation of the first substrate 21 or the second substrate 22 is allowed, the first substrate 21 or the second substrate 22 will further compress the pressure-sensitive ink 23a, 23b applied with the initial load, for detection of a pressing force. Alternatively, the adhesion member 30 can comprise an adhesive agent or a double-sided adhesion member having elasticity or can be various kinds of elastic member (including the layers for adhesion to the substrates 21, 22) such as rubber, a torsion coil spring, a plate spring, etc which is disposed under such condition to exert a tensile force. Incidentally, in FIG. 4, the pressure detection portion 23 and the adhesion member 30 are shown to be spaced from each other. However, the pressure detection portion 23 and the adhesion member 30 can partially contact each other. Further, the adhesion member 30 need not necessarily be provided on the both side portions of the electrodes 21a, 21b and the pressure-sensitive ink 23a, 23b. Rather, it will suffice for the adhesion member 30 to be provided in at least one side portion of the electrodes 21a, 21b and the pressure-sensitive ink 23a, 23b.

In the above, it is preferred that the adhesion member 30 have a thickness smaller than the thickness of the pressure detection portion 23. This arrangement will apply a force to the adhesion member 30 disposed which force causes the member 30 to retain its initial thickness. And, this force will act to draw the first substrate 21 and the second substrate 22 closer to each other. In this way, by reducing the distance between the first substrate 21 and the second substrate 22 and reducing the thickness of the pressure detection portion 23 under its non-pressurized state, initial load is applied to the pressure-sensitive ink 23a, 23b as a result thereof.

Next, the operation of the pressure detection unit 20 mounted in the information input device 1 will be explained. Inside the information input device 1, the upper electrode 21a and the lower electrode 22a are connected to a connector (not shown) which is connected in turn to a load detection portion (not shown) incorporated within the information input device.

Change is detected in the resistance applied to the upper pressure-sensitive ink 23a and the lower pressure-sensitive ink 23b of the pressure detection portion 23 of the pressure detection unit 20 when the panel member 4 is pressed. With this detection of resistance change, an external force applied to the pressure-sensitive ink 23a, 23b can be detected and the load to the panel member 4 can be detected.

In the above, since the pressure detection unit 20 is provided with the adhesion member 30 which draws the first substrate 21 and the second substrate 22 to each other, initial load is applied to the pressure-sensitive ink 23a, 23b prior to a pressing operation to the panel member 4. With this, the load range from the zero-load to stable detection load where there is significant irregularity in detection values (resistance values) is cancelled out. Therefore, at the time of subsequent pressing operation on the panel member 4, a value detected by the pressure detection portion 23 can be used directly for controlling information input.

The first substrate 21 and the second substrate 22 can be e.g. films or the like and the material thereof can be a general-purpose resin such as polyethylene terephthalate, polystyrene-based resin, polyolefin-based resin, ABS resin, AS resin, acryl-based resin, AN resin, or a general-purpose engineering resin such as polystyrene-based resin, polycarbonate-based resin, polyacetal-based resin, polycarbonate modified polyphenylene ether resin, polybutylene terephthalate resin, ultrahigh molecular weight polyethylene resin, or a super-engineering resin such as polysulphone resin, polyphenylene sulfide based resin, polyphenylene oxide based resin, polyarylate resin, polyetherimide resin, polyimide resin, liquid crystal polyester resin, polyallyl based heat resistant resin.

The material for forming the upper electrode 21a and the lower electrode 22a can be a metal such as gold, silver, copper, nickel, or a conductive paste of carbon etc. The method of forming these can be a printing method such as screen printing, offset printing, gravure printing or flexo printing, or a photoresist technique. Further alternatively, the upper electrode 21a and the lower electrode 22a can be formed by affixing a metal foil of copper, gold or the like. Further alternatively, the upper electrode 21a and the lower electrode 22a can be formed by forming an electrode pattern by resist on an FPC plated with a metal such as copper and then etching the portion of the metal foil not protected by the resist. The electrodes can be formed by a method combining the above described forming methods or stacking (or laminating) the materials cited above.

The composition for forming the upper pressure-sensitive ink 23a and the lower pressure-sensitive ink 23b of the pressure detection portion 23 comprises a material whose electrical characteristics such as its electric resistance value varies according to an external force. As such composition, quantum tunneling composite (commercial name "QTC") manufactured by Peratech Limited of U.K. can be used. The upper pressure-sensitive ink 23a and the lower pressure-sensitive ink 23b can be mounted on the first substrate 21 and the second substrate 22 by applying technique. Such applying technique can be printing method such as screen printing, offset printing, gravure printing or flexo printing. The pressure-sensitive ink may be applied to only one face of the first substrate 21 and the second substrate 22.

The pressure detection unit 20 is affixed to the lower face of the panel member 4 of the information input device 1 by means of an adhesive agent such as glue, or an adhesion layer such as a two-sided adhesion tape, and is disposed in the form of frame so as to be hid by an ornamental portion of a peripheral edge portion 4A of the panel member 4. Therefore, the respective components constituting the pressure detection unit 20 can be formed of not only transparent material, but of colored material. Further, the pressure detection unit 20 can be disposed in the opening portion 2A with adhesively affixing the unit 20 on the support portion 2b with using the adhesion layer.

Embodiment 2

Figure 6:
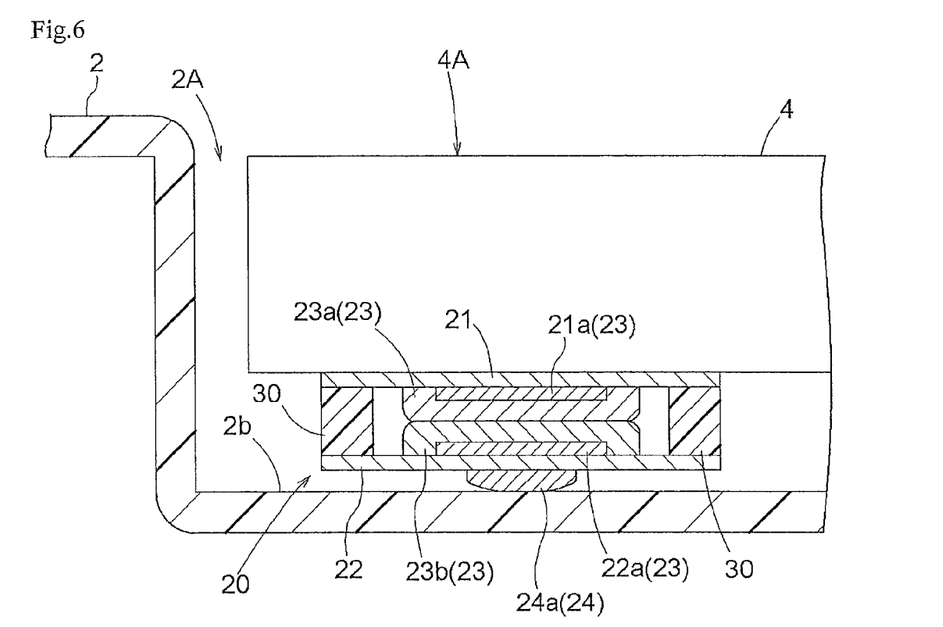
FIG. 6 is a view showing the pressure detection unit having bumps.
Figure 7:
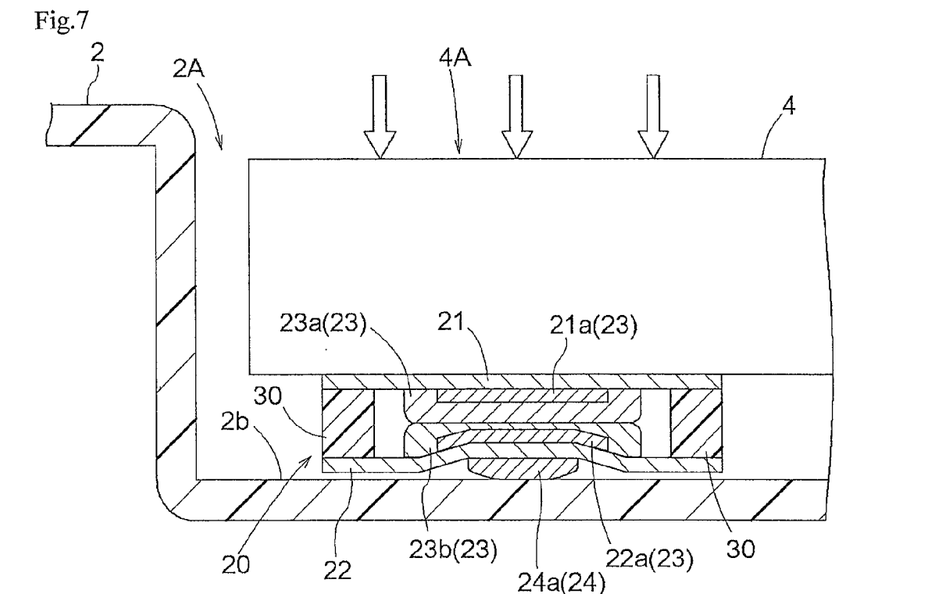
FIG. 7 is a view illustrating operational condition of the pressure detection unit having the bumps.

As shown in FIG. 5 and FIG. 6, on the outer face of the second substrate 22, bumps 24a can be provided as a load transmission member 24. The mounting (disposing) area of the bumps 24a is set to be smaller than the contact area between the pressure detection portion 23 and the second substrate 22. When an external load is applied to the pressure detection portion 23, the bumps 24a support the lower pressure-sensitive ink 23b from under and transmits this load in a concentrated manner to the lower pressure-sensitive ink 23b (FIG. 7). As some exemplary specific constructions of the bump 24a, this can be formed by applying or printing a heat curable resin or UV curable resin and curing it, or can be a sheet of film or resin plate cut in dimensions to suit the pressure detection portion and affixed thereto, or can be a foam material such as PE foam, urethane foam, etc. The bump 24a can be provided on the outer face of the first substrate 21 or can be provided on the outer faces of both the first substrate 21 and the second substrate 22. In this, the height size of the bump 24a is set as e.g. from 50 μm to 200 μm (including the thickness of the adhesion layer for adhesion to the second substrate 22). Preferably, the bumps 24a are disposed on the back face side (immediately below) of the positions where the pressure-sensitive ink 23a, 23b is disposed. With this arrangement, the upper pressure-sensitive ink 23a and the lower pressure-sensitive ink 23b can be pressed against each other in a reliable manner, so that the pressure determination accuracy of the pressure detection unit 20 can be improved.

Embodiment 3

Preferably, as shown in FIG. 6 and FIG. 7, the bump 24a is formed in such manner that its cross sectional area progressively decreases as it extends away from the outer face of the second substrate 22 on which it is disposed. This arrangement allows a certain amount of posture change between the pressure-sensitive ink 23a, 23b and the external member (e.g. the panel member, etc.) which presses the pressure-sensitive ink 23a, 23b. Therefore, when posture change between the pressure-sensitive ink 23a, 23b and the external member is small, the bump 24a restricts dispersion of the load applied from the outside to the other portion than the pressure-sensitive ink 23a, 23b. Incidentally, the bump 24a can be either a non-elastic member or an elastic member.

Figure 8:
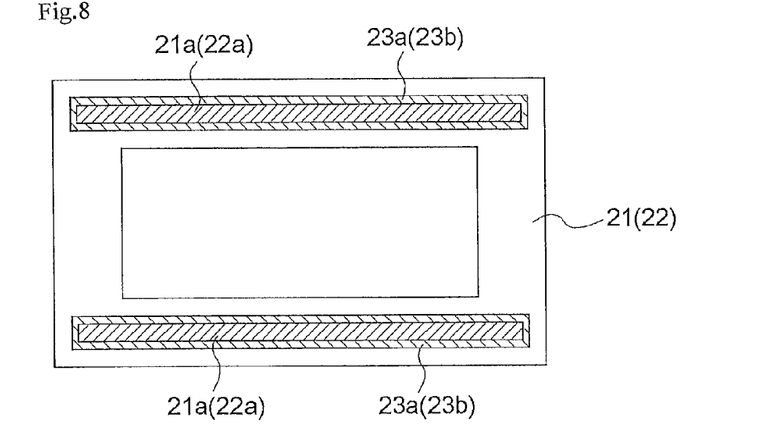
FIG. 8 is a view showing layouts of electrodes and pressure-sensitive ink in a pressure detection unit according to a further embodiment.
Figure 9:
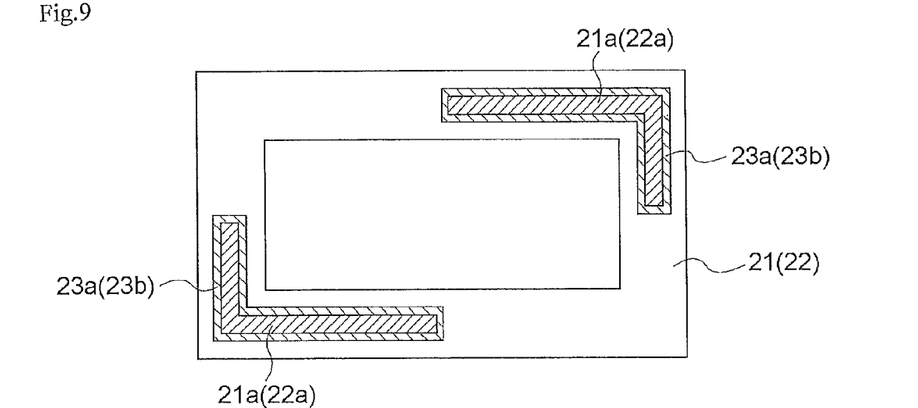
FIG. 9 is a view showing layouts of electrodes and pressure-sensitive ink in a pressure detection unit according to a further embodiment.

OTHER EMBODIMENTS (1) In the foregoing embodiment, the pressure detection unit 20 was explained. Instead, a pressure detection device may be formed by mounting the pressure detection portion 23 to the panel member 4. In this case, the pair of electrodes 21a, 22a of the pressure detection portion 23 are not limited to the frame shape. For instance, as shown in FIG. 8, the linear-shaped electrodes 21a, 22a may be disposed at the edge portion of the panel member 4 along its longitudinal direction. Or, as shown in FIG. 9, the linear-shaped electrodes 21a, 22a may be disposed in L-shape so as to include the corner portions on the diagonal lines of the panel member 4.

If the pair of electrodes 21a, 21b are disposed at the longitudinal opposing portions of the panel member 4, the pressure-sensitive ink 23a, 23b covering the electrodes 21a, 21b too are disposed at the longitudinal opposing portions of the panel member 4. As the panel member 4 tends generally to be warped or flexed along the longitudinal direction, with the arrangement of disposing the pressure detection portion 23 at the longitudinal opposing portions of the panel member 4, there can be secured a large disposing area for the pressure detection portion 23 relative to the panel member 4.

Further, in case the pressure detection portion 23 is disposed at symmetric positions of the panel member 4 as seen in the plane view, this will further facilitate alignment between the pressing area of the panel member 4 and the pressure detection area surrounded by the pressure detection portion 23. Therefore, even if the pressure detection portion 23 is not provided in the entire peripheral edge portion of the panel member 4, it is possible to detect an applied pressing force in substantially entire area of the panel member 4.

Figure 10:
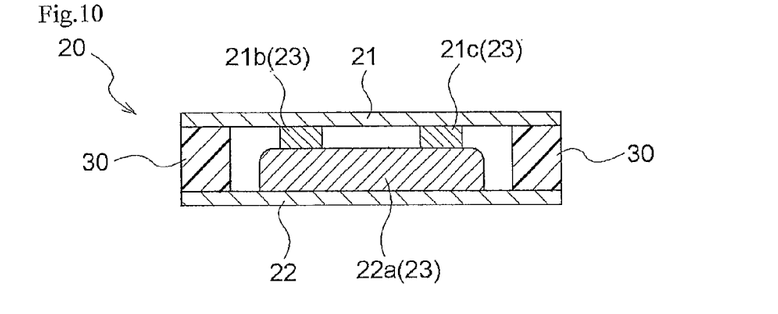
FIG. 10 is a view showing layouts of electrodes and pressure-sensitive ink in a pressure detection unit according to a further embodiment.

(2) In the foregoing embodiment, explanation was given with using the pressure detection portion 23 wherein the pair of electrodes 21a, 22a are disposed between the first substrate 21 and the second substrate 22 and the pressure-sensitive ink 23a, 23b are disposed between the pair of electrodes. Instead, the pressure detection portion 23, as shown in FIG. 10, can be configured such that the pair of electrodes are disposed on either one of the first substrate 21 and the second substrate 22 and the pressure-sensitive ink 23a, 23b are disposed on the other one of the first substrate 21 and the second substrate 22 in such a manner to cover the pair of electrodes. With this arrangement, the electrode layer is formed as a single layer, thus further reducing the thickness of the pressure detection portion 23. As a result, it becomes possible to reduce the thickness of the pressure detection unit 20. In this case, if the pair of electrodes are provided in the form of comb or coil to control their contact area with the pressure-sensitive ink, it becomes possible to obtain signals from a desired detection range.

(3) In the foregoing embodiment, explanation was given with using the two layers of the upper pressure-sensitive ink 23a and the lower pressure-sensitive ink 23b as the pressure-sensitive ink. However, the arrangement of the ink is not particularly limited as long as it allows detection of a pressing force. So, the pressure-sensitive ink may be provided as a single layer, if desired.

INDUSTRIAL APPLICABILITY

The pressure detection unit and the pressure detection device relating to the present invention are useful for use in an electronic device such as a mobile phone, a smart phone, a PDA, a car navigation device, a digital camera, a digital video camera, a game machine, a tablet PC, etc. And, the unit and the device can be effectively utilized for achieving multi-functionalization and operability of such electronic device.

The invention claimed is:

1. A pressure detection unit comprising:
a first substrate and a second substrate which are disposed in opposition to each other and subject to load from the outside;
a pair of electrodes provided in distribution in the first substrate and the second substrate, the electrodes being disposed linearly in opposition to each other,
electrically conductive pressure-sensitive ink disposed between the pair of electrodes to cover at least one of these electrodes and having electrical characteristics which varies according to the load, and
an adhesion member for adhering the first substrate and the second substrate to each other with the pair of electrodes being placed in contact with the pressure-sensitive ink,
wherein the pair of electrodes are arranged in the form of frames, and
the adhesion member has a frame-like first adhesion part disposed in the inside of the pair of electrodes, and a frame-like second adhesion part disposed in the outside of the pair of electrodes.

2. A pressure detection unit according to claim 1, wherein the first substrate and the second substrate are provided in the form of frames.

3. A pressure detection unit according to claim 1, wherein the adhesion member draws the first substrate and the second substrate to each other, thereby to apply an initial load to the pressure-sensitive ink.

4. A pressure detection unit according to claim 1, further comprising a load transmission member provided on at least one of the outer face of the first substrate and the outer face of the second substrate for transmitting the load to the pressure-sensitive ink in concentration.

5. A pressure detection unit according to claim 4, wherein the load transmission member is formed with its cross sectional area progressively decreased as it extends away from the outer face of the first substrate or the second substrate.

6. A pressure detection device with a panel member having a rectangular outer shape and a pressure detection portion for detecting a pressing force to the panel member;
wherein the pressure detection unit defined in claim 1 is used as the pressure detection portion, the pressure detection portion being disposed in at least a part of an edge portion along the longitudinal direction of the panel member.

* * * * *